United States Patent
Wang et al.

(10) Patent No.: US 11,902,658 B2
(45) Date of Patent: Feb. 13, 2024

(54) INSTANT AUTO-FOCUS WITH DISTANCE ESTIMATION

(71) Applicant: Advanced Micro Devices, Inc., Santa Clara, CA (US)

(72) Inventors: Po-Min Wang, Hsinchu (TW); Yu-Huai Chen, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 321 days.

(21) Appl. No.: 17/007,347

(22) Filed: Aug. 31, 2020

(65) Prior Publication Data

US 2022/0070357 A1 Mar. 3, 2022

(51) Int. Cl.
- *H04N 23/67* (2023.01)
- *G01B 11/26* (2006.01)
- *G01B 11/02* (2006.01)

(52) U.S. Cl.
CPC ........... *H04N 23/67* (2023.01); *G01B 11/026* (2013.01); *G01B 11/26* (2013.01)

(58) Field of Classification Search
CPC .................................. H04N 5/23212
USPC .......................................... 348/345
See application file for complete search history.

(56) References Cited

U.S. PATENT DOCUMENTS

2008/0226274 A1\* 9/2008 Spielberg ......... H04N 5/232121
396/50

FOREIGN PATENT DOCUMENTS

EP WO2010149763 \* 6/2009

OTHER PUBLICATIONS

Alizadeh, Peyman, "Object Distance Measurement Using a Single Camera for Robotic Applications", Thesis, Sep. 2, 2014, 126 pages.
Jang et al., "Sensor-Based Auto-Focusing System Using Multi-Scale Feature Extraction and Phase Correlation Matching", Sensors, Mar. 2015, pp. 5747-5762, vol. 15, Issue 3.
Kok et al., "Using Inertial Sensors for Position and Orientation Estimation", Foundations and Trends in Signal Processing, 2017, 90 pages, vol. 11, No. 1-2, https://arxiv.org/pdf/1704.06053.pdf. [Retrieved Jun. 9, 2020].
Krishnan et al., "Estimation of Distance to texture surface using complex log mappng", Journal of Computer Applications, Jul.-Sep. 2010, pp. 16-21, vol. III, No. 3.

(Continued)

*Primary Examiner* — Joel W Fosselman
(74) *Attorney, Agent, or Firm* — Kowert, Hood, Munyon, Rankin & Goetzel, P.C.; Rory D. Rankin

(57) ABSTRACT

Systems, apparatuses, and methods for implementing an instant auto-focus mechanism with distance estimation are disclosed. A camera includes at least an image sensor, one or more movement and/or orientation sensors, a timer, a lens, and control circuit. The control circuit receives first and second images captured by the image sensor of a given scene. The control circuit calculates a distance between first and second camera locations when the first and second images, respectively, were captured based on the one or more movement and/or orientation sensors and the timer. Next, the control circuit calculates an estimate of a second distance between the camera and an object in the scene based on the distance between camera locations and angles between the camera and the object from the first and second locations. Then, the control circuit causes the lens to be adjusted to bring the object into focus for subsequent images.

20 Claims, 11 Drawing Sheets

(56) References Cited

OTHER PUBLICATIONS

Murawski, Krzysztof, "Method of Measuring the Distance to an Object Based on One Shot Obtained from a Motionless Camera with a Fixed-Focus Lens", Acta Physica Polonica Series a (ACTA PHYS POL A), Jun. 2015, pp. 1591-1595, vol. 127, No. 6.
Robisson et al., "Autofocus measurement for imaging devices", IS&T International Symposium on Electronic Imaging Science and Technology, Jan. 29, 2017, pp. 209-218, https://pdfs.semanticscholar.org/c47f/5578659b2e896744baae2c2c2460758c5610.pdf. [Retrieved Jun. 9, 2020].
Zaarane et al., "Distance measurement system for autonomous vehicles using stereo camera", Array, Mar. 2020, 7 pages, vol. 5, https://www.sciencedirect.com/science/article/pii/S2590005620300011?via%3Dihub. [Retrieved Jun. 24, 2020].

\* cited by examiner

INSTANT AUTO-FOCUS WITH DISTANCE ESTIMATION

BACKGROUND

Description of the Related Art

Most cameras include an automatic focus mechanism to automatically adjust the lens settings to cause an image to be in focus. However, the time it takes for the auto-focus mechanism to find a suitable lens setting can result in a negative user experience if the shot-to-shot time or start-to-shot time is too long. The shot-to-shot time refers to the time in between successive images captured by the camera, while the start-to-shot time refers to the time it takes for the camera to capture an image from when the user activates the camera (i.e., presses the shutter button).

Auto-focus mechanisms in cameras can use a variety of different techniques. These techniques include contrast, phase detection, and laser. Contrast and phase detection are passive technologies which rely on the light field emitted by the scene. As used herein, the term "scene" is defined as a real-world environment captured in an image by a camera. In other words, the image, captured by the camera, represents the scene.

Laser is an active technology with a laser beam being emitted toward the scene to assist in determining the distance to the subject matter. Contrast auto-focus techniques are widely used in digital cameras. A contrast auto-focus mechanism uses the image signal to determine the focus position by measuring the intensity difference between adjacent pixels of the captured image which should increase as the lens position moves closer to the focus position. As used herein, the term "lens position" refers to the position of the lens of a given camera with respect to the image sensor of the given camera. Also, as used herein, the term "focus position" refers to the optimal lens position that causes an object in a scene to be in focus in the captured image.

Phase detection auto-focus mechanisms work by splitting the incoming light into pairs and comparing the difference between the individual units. The shift between signals received from the left and right side of the lens aperture can be used to determine the distance of the object from the camera. Once the distance to the object is obtained, the lens is adjusted to the focus position to obtain an in-focus picture of the object. Often, phase detection pixels are included in the main image sensor, allowing this technology to be used in a wide variety of cameras and end-user devices. Laser auto-focus mechanisms measure the time it takes for light to hit an object and bounce back to the camera so as to estimate the distance between the object and the camera.

The accuracy of an auto-focus mechanism is important for a camera since blurry pictures are undesirable, regardless of other image quality characteristics. Another goal of an auto-focus mechanism is to converge quickly so that the picture can be captured in close temporal proximity to when the user presses the shutter button. Often times, there is a trade-off between the accuracy and speed of an auto-focus mechanism. A camera is in focus when the optical rays received from the subject matter reach the sensor at the same point in the image plane. For an object at infinity, this is the case when the lens is placed at its focal length from the image sensor. For objects closer to the camera, the lens is moved further away from the image sensor. A challenge with an auto-focus mechanism is the ability to determine and reach the correct focus position quickly.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing an instant auto-focus mechanism with distance estimation are disclosed herein. In one implementation, a camera includes at least an image sensor, one or more movement and/or orientation sensors, a timer, a lens, and a control circuit. The control circuit receives first and second images captured by the image sensor of a given scene. The control circuit calculates a first distance between first and second camera locations when the first and second images, respectively, were captured based on the one or more movement and/or orientation sensors and the timer. Next, the control circuit calculates an estimate of a second distance between the camera and an object in the scene based on the first distance and angles between the camera and the object from the first and second locations. Then, the control circuit causes the lens to be adjusted to bring the object into focus for subsequent images. Through the use of these techniques, a relatively fast auto-focus time can be achieved. This helps to reduce the start-to-shot time period experienced by the user.

Figure 1:
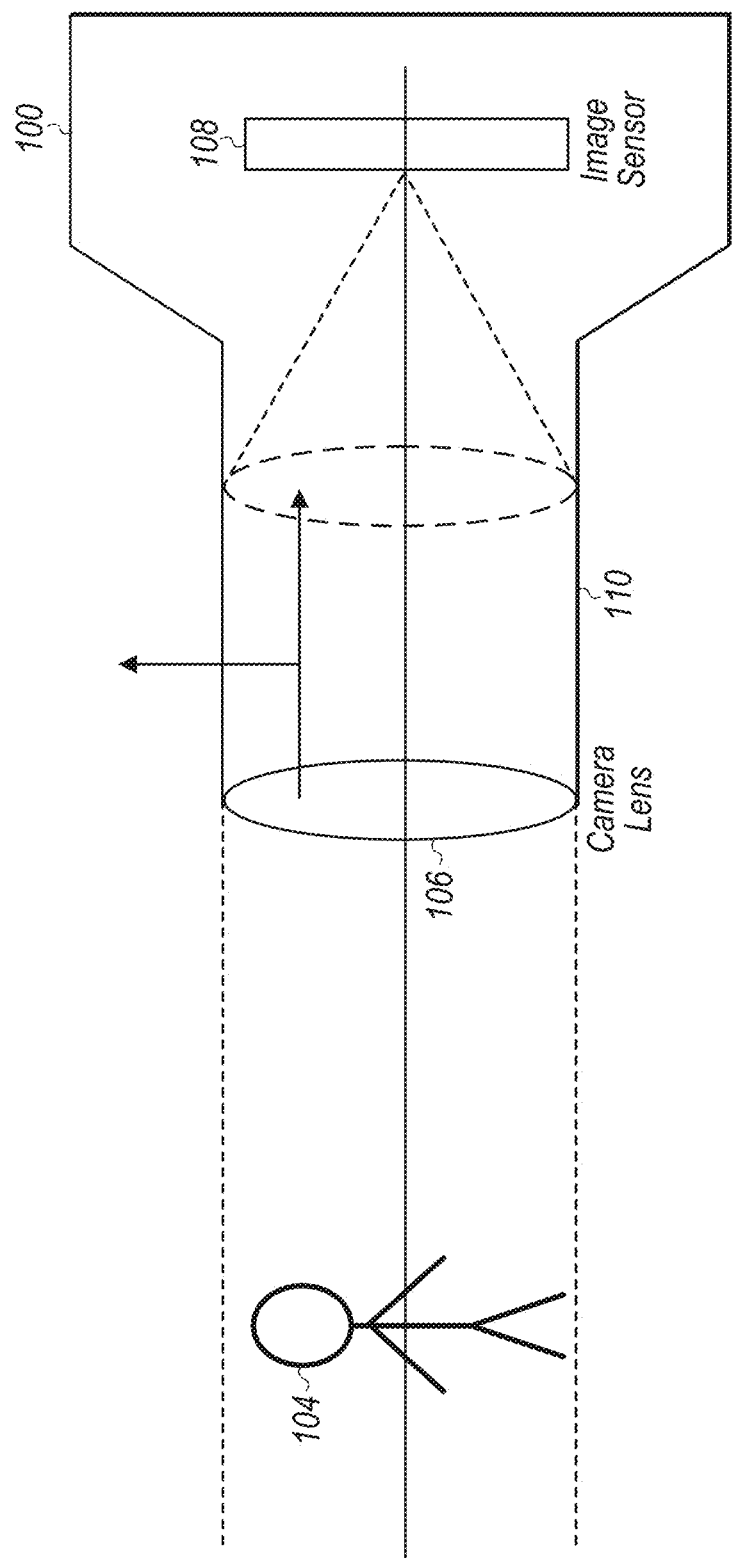
FIG. 1 is a block diagram of one implementation of a camera.

Referring now to FIG. 1, a diagram of one implementation of a camera 100 is shown. In one implementation, camera 100 includes at least lens 106 and image sensor 108. The distance between lens 106 and image sensor 108 can be adjusted depending on the distance to an object (e.g., person 104) being captured. When first capturing an image of person 104, the camera 100 does not have knowledge of the appropriate location for lens 106 to cause person 104 to be in focus. The start-to-shot time period experienced by the user can be too long if camera 100 is not able to determine the appropriate in-focus location in an efficient manner. Accordingly, techniques for implementing an instant auto-focus mechanism with distance estimation will be described throughout the remainder of this disclosure. These techniques help to reduce the start-to-shot time period which enhances the overall user experience. It is noted that any type of system or device can implement the techniques described herein, including an integrated circuit (IC), processing unit, mobile device, tablet, computer, camera, automobile, wearable device, and other types of computing devices and systems. Also, while the descriptions herein often refer to images, it should be understood that these descriptions also apply to video frames captured by a video camera or other devices capable of capturing a sequence of images.

Figure 2:
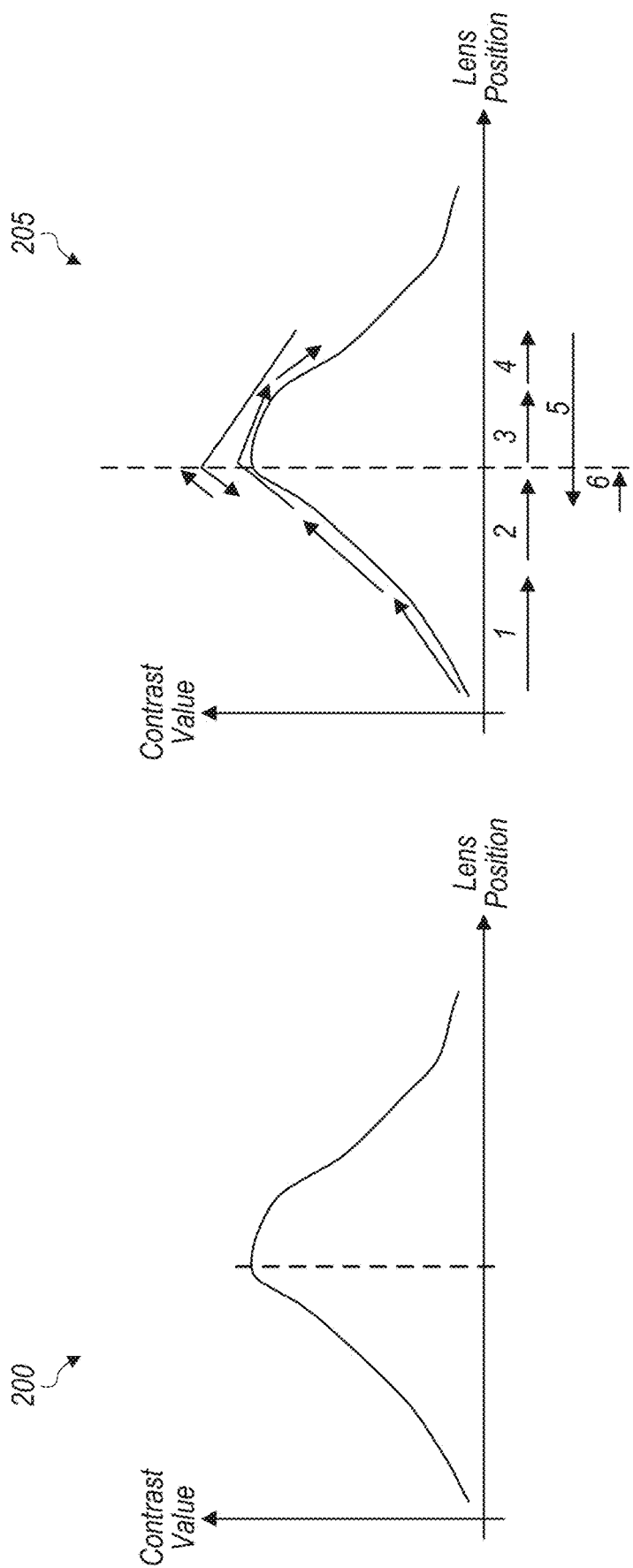
FIG. 2 includes graphs plotting the contrast value versus lens position for a given camera.

Turning now to FIG. 2, graphs 200 and 205 plotting the contrast value versus lens position for a given camera are shown. Graph 200 illustrates an example plot of contrast value versus lens position for a given camera. As used herein, the term "contrast value" refers to the intensity difference between adjacent pixels of a captured image. In one implementation, the contrast value is calculated as an average of the intensity difference of a group of pixels (e.g., a region of interest). It is noted that the terms "contrast value" and "contrast measurement" can be used interchangeably herein. The dashed vertical line in the center of graph 200 represents the optimal point for capturing an in-focus image of a scene by the given camera. Graph 205 illustrates an example of the steps which may be performed to adjust the lens position to achieve the maximum contrast value. If the camera starts with the lens position on the far left side of graph 205, then a typical algorithm for adjusting the lens position can take 6 steps to achieve the optimal lens position. The first two steps move toward the optimal point while steps 3 and 4 overshoot the optimal point. Step 5 is a reversal to make up for the overshoot, and then step 6 returns back to the optimal point. As can be seen, it can take multiple steps to reach the optimal lens position, which can cause an unacceptable delay. This delay can have a negative impact on the user experience.

Figure 3:
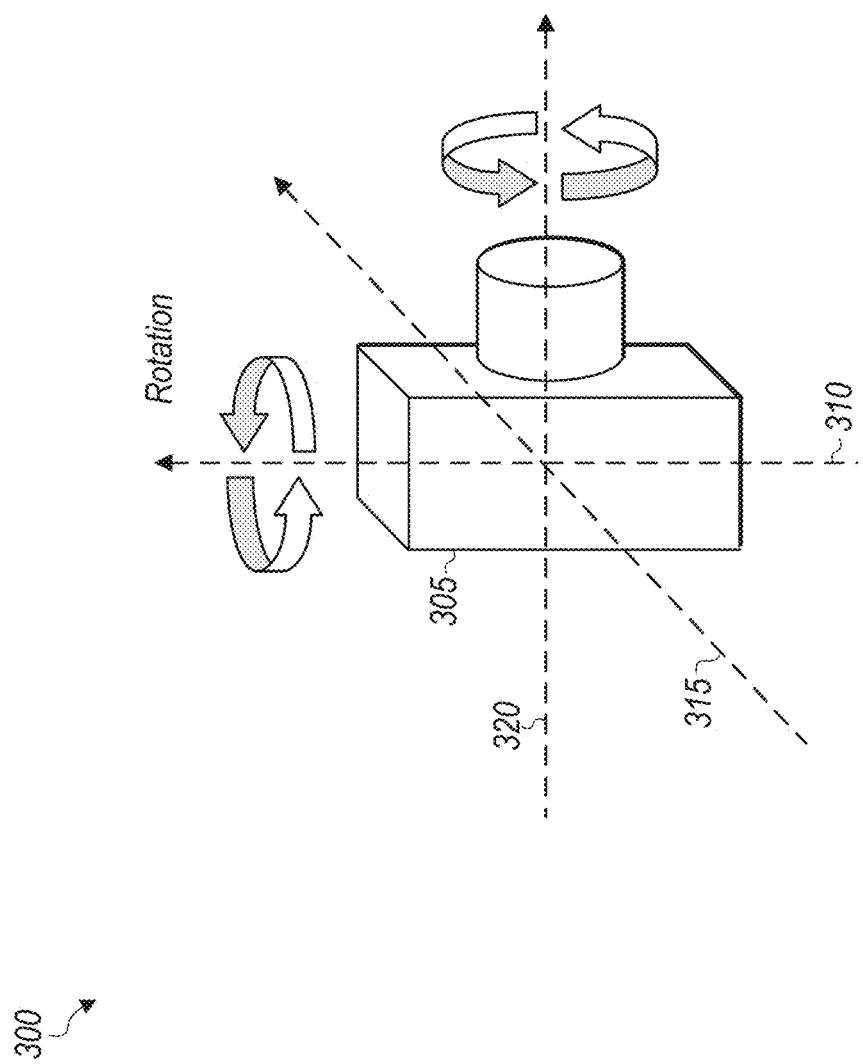
FIG. 3 includes a diagram of one implementation of a camera and axes of rotation.

Referring now to FIG. 3, a diagram 300 of one implementation of a camera 305 and axes of rotation is shown. Diagram 300 illustrates an example of a camera 305 and axes of rotation 310, 315, and 320. The rotation of camera 305 is able to be detected by a gyroscope and/or other sensors within camera 305. Changes in the rotation and location of camera 305 will cause objects being captured in images by camera 305 to move in and out of focus. It is noted that while camera 305 is drawn as a traditional camera, camera 305 is representative of any type of device (e.g., phone) that includes the functionality of a camera. Devices that include the functionality of a camera include, but are not limited to, a smartphone, tablet, computer, security device, head mounted display, body worn device, other wearable device, a device mounted on a motor vehicle, or other types of systems or devices.

As a typical user holds camera 305 in their hand, the location, orientation, and rotation of camera 305 will change during operation, and these changes can be used to determine the distance between camera 305 and the scene being captured. Once the distance is determined, the lens of camera 305 is adjusted to the optimal lens position to bring the scene into focus. The adjustment of the lens can occur even without the user actually taking a photo of the scene. For example, if camera 305 is on and the user is pointing camera 305 at a scene, the natural movements of camera 305 as the user's location and orientation of camera 305 change allow multiple perspectives of the scene to be captured, with or without the shutter button being pressed. These changes can then allow the scene to be brought into focus so that when the user finally presses the shutter button, an in-focus image can be captured quickly without a long delay caused by a traditional auto-focus mechanism.

Figure 4:
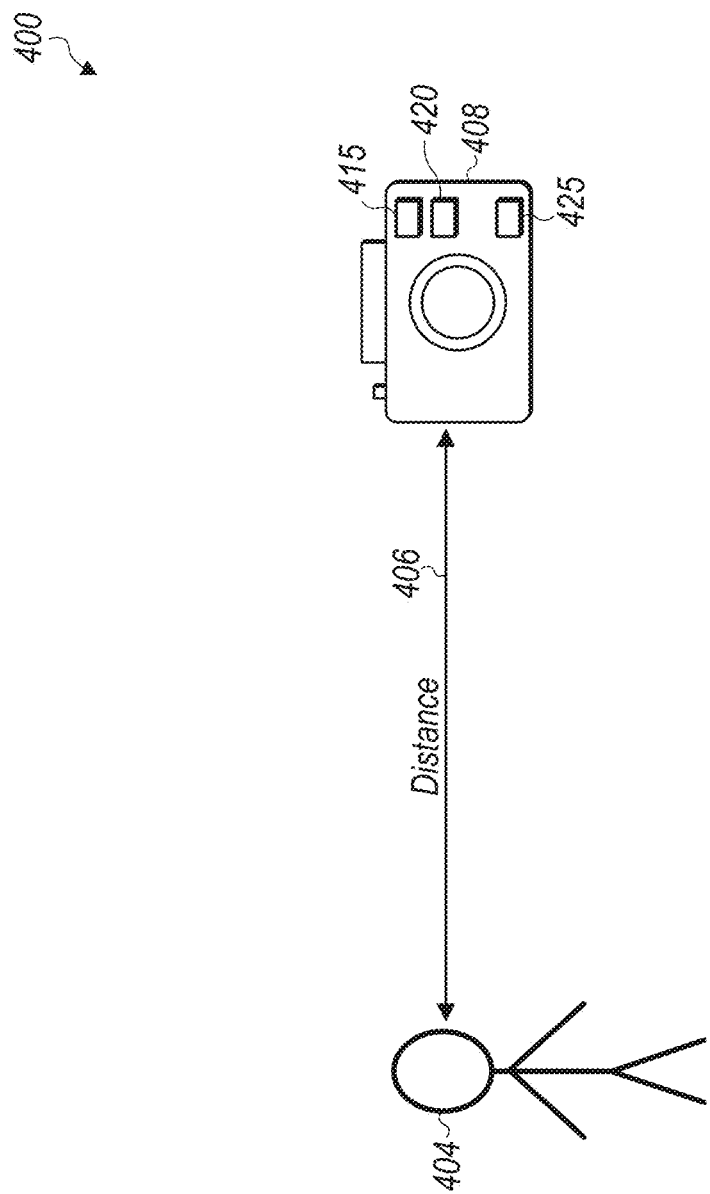
FIG. 4 is a diagram of one implementation of a camera.

Turning now to FIG. 4, a diagram of one implementation of a camera 408 is shown. In one implementation, camera 408 is attempting to focus on a person 404, with the person 404 representative of any type of object or scene being captured by camera 408. In order for camera 408 to adjust the lens to focus on person 404, the distance 406 to person 404 is determined. Then, the distance 406 is used to adjust the lens so that person 404 is in focus when an image is captured. This approach allows an automatic focus mechanism to converge more quickly than a traditional focus mechanism.

In one implementation, camera 408 includes multiple components which help in the calculation of an estimate of distance 406. These components include gyroscope 415, G-sensor 420, and clock 425. Gyroscope 415 and G-sensor 420 detect the motion of camera 408, while clock 425 captures a timestamp for each measurement taken by camera 408. In one implementation, gyroscope 415 measures the rate of change of the orientation of camera 408. In one implementation, G-sensor 420 is an accelerometer that measures the acceleration of camera 408. G-sensor 420 can also be referred to as accelerometer 420. In one implementation, clock 425 maintains a running counter representative of the time, and timestamps can be taken when various events occur and/or various measurements are taken. Clock 425 can also be referred to as timer 425. In other implementations, camera 408 can include other components to detect the movement, displacement, acceleration, time, and/or other parameters.

Figure 5:
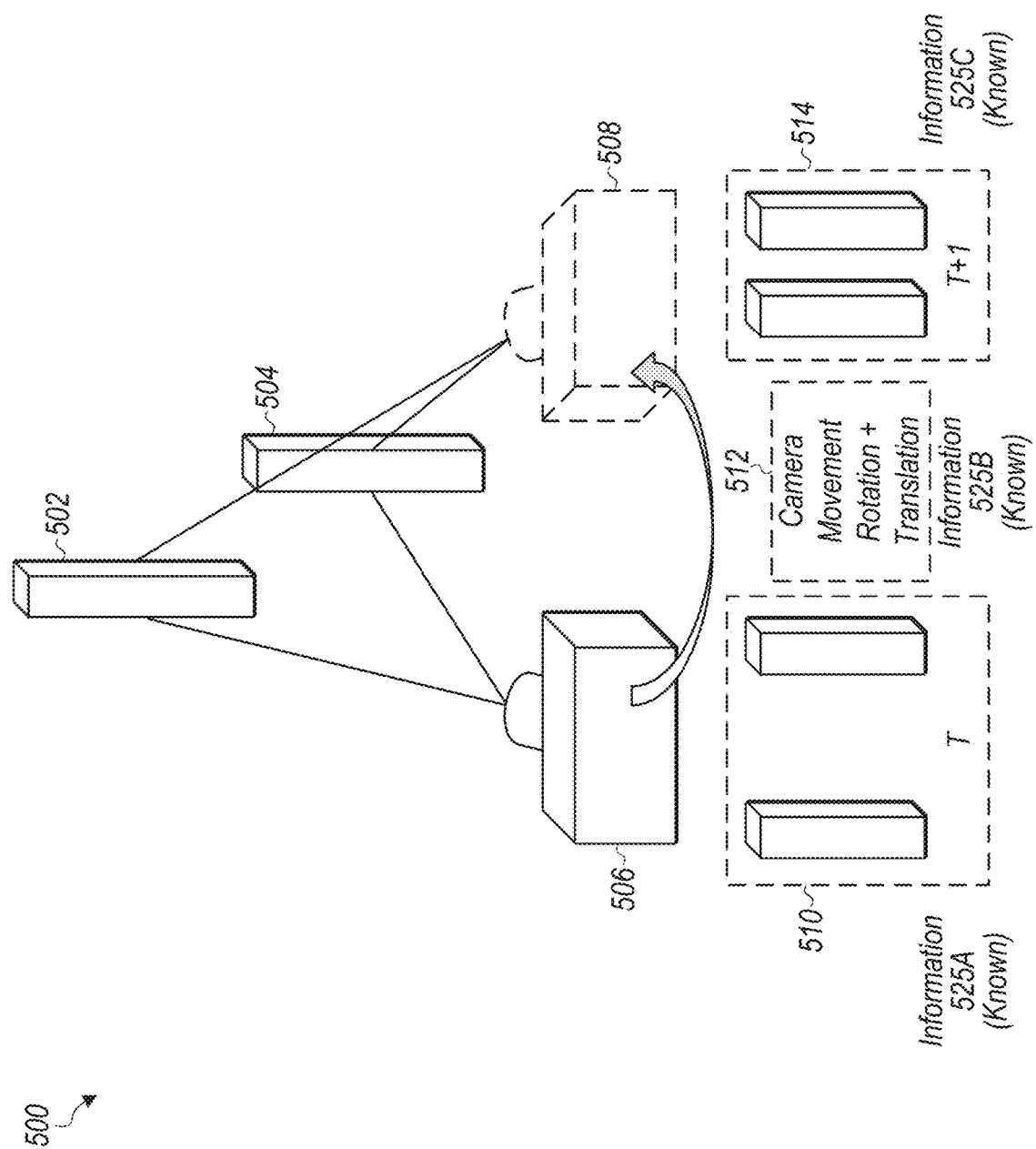
FIG. 5 is a diagram of one implementation of camera movement when capturing a scene.

Referring now to FIG. 5, a diagram of one implementation of camera movement when capturing a scene 500 is shown. In one implementation, scene 500 includes objects 502 and 504 which are representative of any number and type of objects which are detected during an analysis of one or more captured images. It is noted that these captured images do not have to be captured in response to a user pressing a shutter button. Rather, camera 506 can capture images and perform the analysis of the captured images to detect objects automatically. Camera 506 is in a first location when oriented toward scene 500, and snapshot 510 represents a momentary frame of reference captured for scene 500. It is noted that snapshot 510 represents the scene visible through the viewfinder for camera 506, and snapshot 510 can be captured by camera 505 whether or not the user actually presses the shutter button. Information 525A is retrieved from snapshot 510, with information 525A including data such as contrast values, the distance between objects 502 and 504, location and orientation (i.e., the direction the front side of camera 506 is facing) of camera 506 when the snapshot 510 was captured, timestamp, and other parameters.

After snapshot 510 is taken, it is assumed for the purposes of this discussion that the user holding camera 506 causes a movement, voluntarily or involuntarily, of camera 506. This new location is represented by the dashed outline of camera location 508. During the movement to the new location, the movement and rotation of the camera is captured by one or more sensors. This movement, rotation, and the translation of the movement and rotation into a new set of location coordinates is represented by dashed box 512 and is referred to as information 525B. A snapshot 514 of objects 502 and 504 taken from location 508 is shown on the bottom right of FIG. 5. Snapshot 514 is referred to as information 525C, which provides another piece of information to allow for the distance to objects 502 and 504 to be estimated with relatively high accuracy. The combination of information 525A, 525B, and 525C allows the distance from the camera to objects 502 and 504 to be estimated.

One example of a technique which is used to estimate the distance to objects 502 and 504 based on information 525A-C is described in further detail below in association with the discussion of FIG. 7. In another implementation, the estimate is generated based on computing a distance between objects 502 and 504 in snapshots 510 and 514. As can be seen in snapshots 510 and 514, objects 502 and 504 appear further apart in the captured image represented by snapshot 510 than they do in the captured image represented by snapshot 514. The change in the separation between objects 502 and 504 from snapshot 510 to snapshot 514, along with the distance between camera locations 506 and 508, can be used to calculate the angles between the camera at locations 506 and 508 and objects 502 and 504. These angles, along with the distance between camera locations 506 and 508, allow the distance to objects 502 and 504 to be estimated.

In a further implementation, the estimate of the distance from the camera to objects 502 and 504 is generated based on computing a ratio of sizes of objects 502 and 504 in snapshots 510 and 514. In other implementations, other suitable techniques can be utilized to generate an estimate of the distance to objects 502 and 504 based on information 525A-C. The estimate of the distance is then used to adjust the camera lens to bring objects 502 and 504 into focus. In cases where only one of the objects is able to be brought into focus due to a relatively large separation between objects 502 and 504, a control circuit in camera 506 can choose the closer of objects 502 and 504 to camera 506 in one implementation. In other implementations, the control circuit can use other criteria (e.g., size, proximity to the center of the scene in the viewfinder) to determine which object to focus on when multiple objects are present in a scene being captured.

Figure 6:
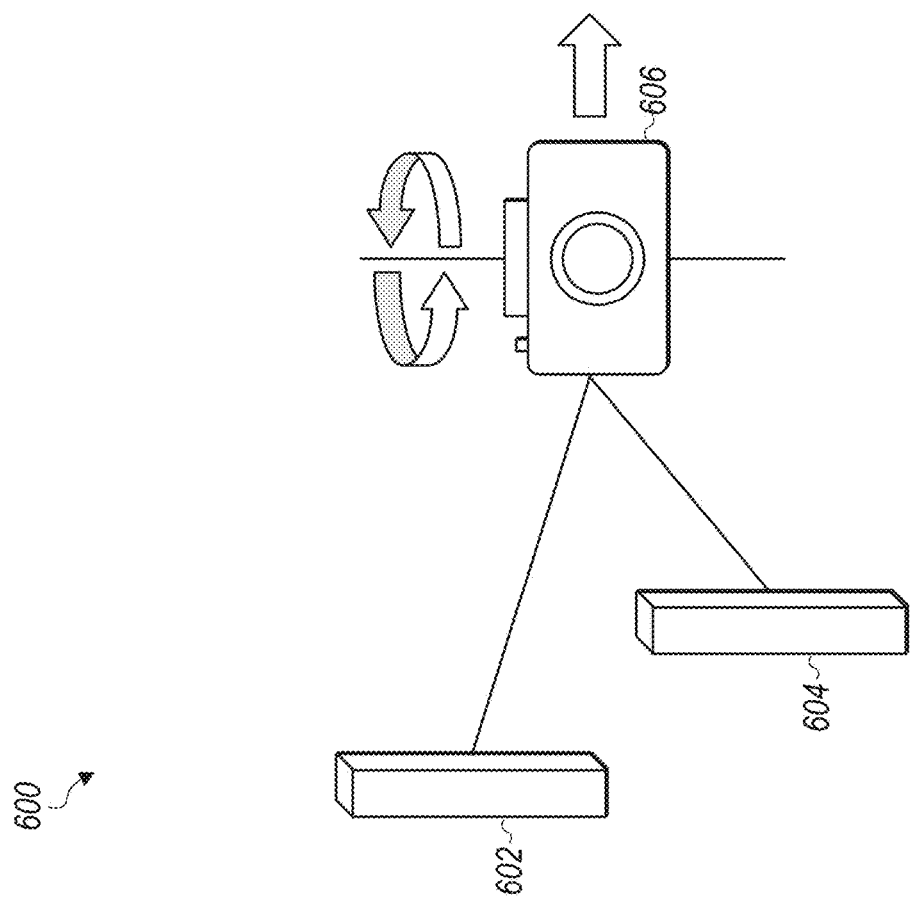
FIG. 6 is a diagram of one implementation of a camera movement and multiple images captured of a given scene.

Turning now to FIG. 6, a diagram of one implementation of a camera movement and multiple images captured of a given scene 600 is shown. Camera 606 is shown in the middle of FIG. 6, and a scene 600 is being captured by camera 606 on the right-side of FIG. 6. The scene 600 includes objects 602 and 604. The rotation and/or movement of camera 606 is indicated by the circular arrows above camera 606. Dashed box 608 represents a first image captured of objects 602 and 604 of scene 600 at a time T from a first location and with a first orientation. Dashed box 610 represents a second image captured of objects 602 and 604 of scene 600 at a time "T+1" from a second location and with a second orientation. A control circuit in camera 606 receives captured sensor readings that measure the camera location, motion, and/or orientation, with dashed box 612 representative of the rotation and translation performed by the control circuit to calculate the camera movement.

An analysis of captured images along with the calculation of the camera movement is then used to generate an estimate of the distance from camera 606 to objects 602 and 604. This estimate of the distance is used to adjust the lens position of camera 606 to bring objects 602 and 604 into focus. For example, the distance between objects 602 and 604 can be calculated based on image analysis for images represented by dashed boxes 608 and 610. Objects 602 and 604 are further apart in the first image than their separation in the second image. The change in distance between objects 602 and 604 for the first and second images allows a control circuit in camera 606 to calculate the angles from the camera to objects 602 and 604 when the first and second images were calculated. The angles, along with the change in camera location calculated from one or more sensor readings, allows the distance from the camera to objects 602 and 604 to be estimated. The estimate of distance is then used to implement a faster auto-focus mechanism.

Figure 7:
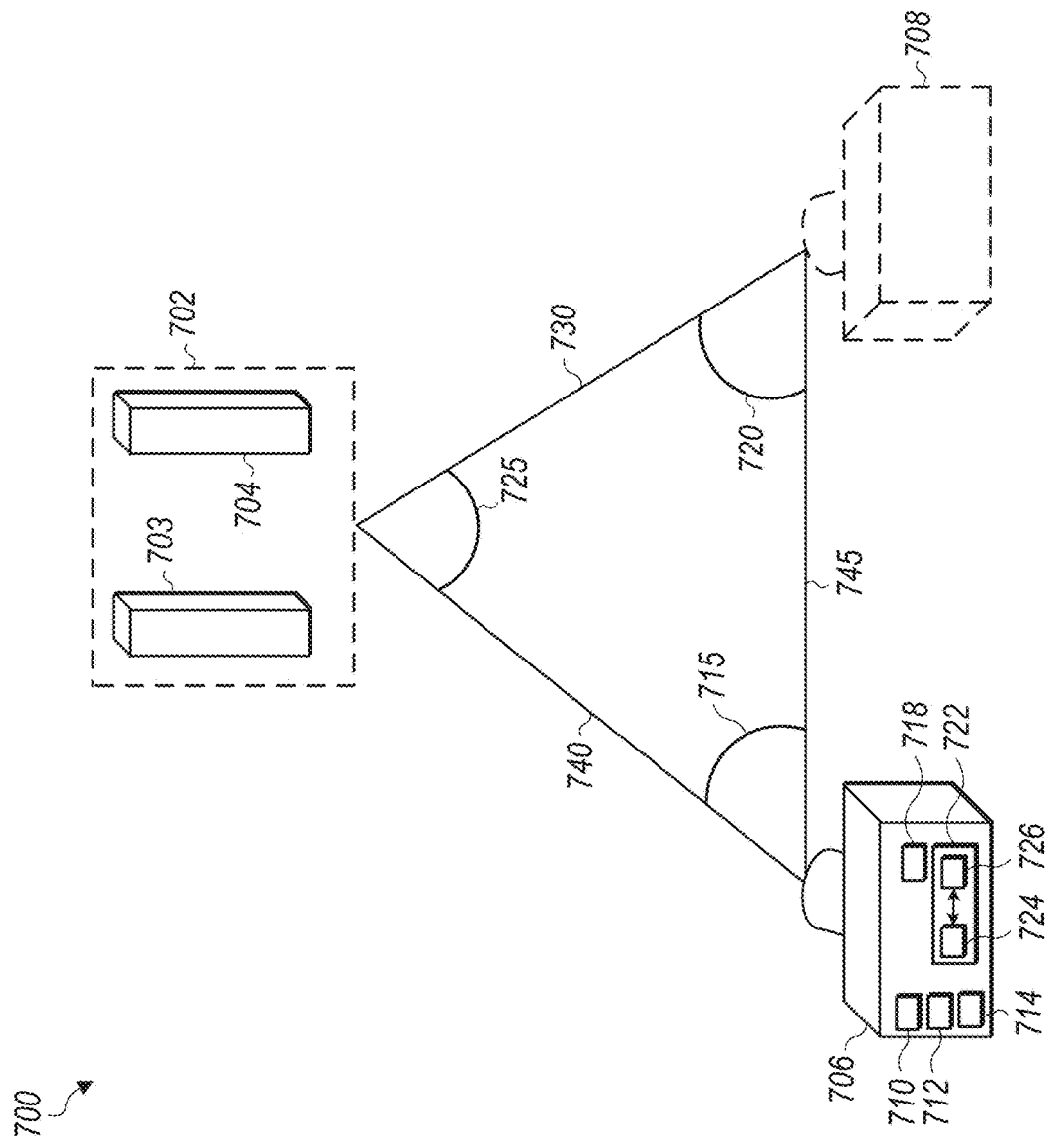
FIG. 7 is a diagram of one implementation of a camera and an object.

Referring now to FIG. 7, a diagram 700 of one implementation of a camera 706 and a scene 702 is shown. Camera 706 is shown in a first location at the bottom left of diagram 700. Camera 706 includes any number of components such as gyroscope 710, accelerometer 712, clock 714, control circuit 722, and memory device 718. Camera 706 can include other components in addition to gyroscope 710, accelerometer 712, clock 714, and control circuit 722 in other implementations, with these other components able to help determine movement, orientation, time, and/or other parameters associated with camera 706. It is noted that depending on the implementation, control circuit 722 can include any suitable combination of hardware and/or software. For example, in one implementation, control circuit 722 includes at least an object detection unit 724 and distance estimation unit 726. It is noted that control circuit 722 can also include any number of other units (e.g., lens positions adjustment unit, contrast measurement unit) in addition to units 724 and 726. In one implementation, object detection unit 724 detects objects within captured images while distance estimation unit 726 generates an estimate of the distance to a detected object from the camera location. Any suitable object detection technique can be utilized by object detection unit 724 for detecting objects within a captured image. If object detection unit 724 is unable to detect an object in a given image, object detection unit 724 can wait for the next captured image and make another attempt at detecting objects. In some cases, object detection unit 724 switches from a first object detection technique to a second object detection technique for the next captured image if the first object detection did not result in a detected object.

In one implementation, at least a portion of the functionality associated with control circuit 722 is performed by one or more processing units executing program instructions. Depending on the implementation, separate processors perform the functions of object detection unit 724 and distance estimation unit 726 or a single processor performs the functions of both of object detection unit 724 and distance estimation unit 726. The processing unit(s) can be any type of processor, such as a central processing unit (CPU), graphics processing unit (GPU), field programmable gate array (FPGA), application specific integrated circuit (ASIC), digital signal processor (DSP), microcontroller, or otherwise. In one implementation, control circuit 722 includes or is coupled to a memory device 718 which stores the program instructions. Memory device 718 is representative of any number and type of memory devices. These memory devices include, but are not limited to, high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others.

The distance 740 between camera 706 and scene 702 is unknown when the first picture is taken by camera 706. Later, camera 706 moves to the location represented by the dashed outline 708. In one implementation, the distance 745 from the original location 706 to new location 708 is calculated by control circuit 722 based on taking the readings of gyroscope 710, accelerometer 712, and clock 714. Control circuit 722 stores digital values representing these readings on memory device 718 in one implementation. For example, analog versions of these readings are captured by analog to digital converters (ADCs) in one implementation. Also, the angle 715 between camera 706 and scene 702 is calculated at the first location based on the distance between objects 703 and 704 in the first captured image and the angle 720 between camera location 708 and scene 702 is calculated at the second location based on the distance between objects 703 and 704 in the second captured image. In one implementation, digital data representing the images captured by camera 706 are stored on memory device 718 and analyzed by control circuit 722 in order to calculate angles 715 and 720. With these values calculated, the other values of the triangle are calculated by control circuit 722.

Objects 703 and 704 are representative of any number of objects in scene 702 which are detected during an analysis of the captured images. In other implementations, more than two objects can be detected during an analysis of captured images. The distance between objects 703 and 704 is calculated for two separate captured images taken at the locations indicated by camera 706 and dashed camera 708. A first distance between objects 703 and 704 is measured for the first image captured at the location indicated by camera 706. A second distance between objects 703 and 704 is measured for the second image captured at the location indicated by dashed camera 708. Then, the difference between the first distance and the second distance is calculated. This difference, combined with the distance 745, is used to estimate the angles 715 and 720. For example, in one implementation, the ratio of the difference between the first and second distances separating objects 703 and 704 and distance 745 is multiplied by a fixed angle (e.g., 180 degrees). The product of the difference ratio and the fixed angle is used as the estimate for angles 715 and 720 in one implementation. In other implementations, other techniques for estimating angles 715 and 720 based on distance 745 and the difference between the first distance and the second distance separating objects 703 and 704 in the first and second images can be used.

For example, in one implementation, the relationship between angles and lengths of triangles is calculated according to the law of sines. Based on the law of sines, distance (745)/sin (angle 725)=distance (740)/sin (angle 720)=distance (730)/sin (angle 715). Also, from Euclidean geometry, the sum of the angles of a triangle is invariably equal to the straight angle (i.e., 180 degrees), which allows the following equation to be generated: (angle 715)+(angle 725)+(angle 720)=180 degrees. This allows angle 725 to be calculated by subtracting angles 715 and 720 from 180 degrees. Accordingly, the distance (730) is calculated as being equal to distance (745)*(sin (angle 715))/(sin (angle 725)). With distance (730) calculated, the camera operating from location 708 can adjust the lens much more quickly to cause scene 702 to be in focus. As the camera continues to move to new locations, other calculations can be performed in a similar manner to adjust the lens to keep scene 702 in focus.

Figure 8:
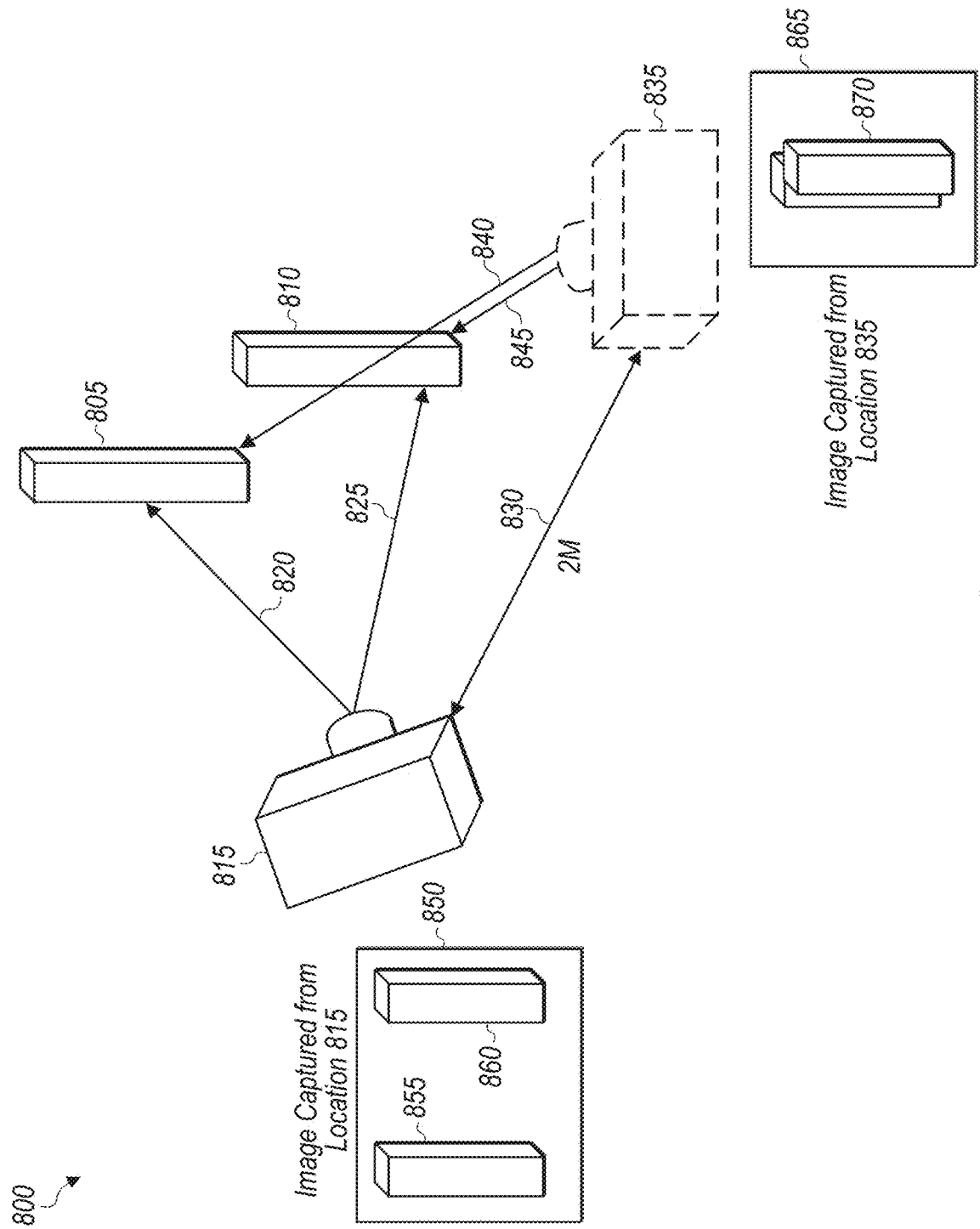
FIG. 8 is a diagram of one implementation of a scene being captured from two different camera locations.

Turning now to FIG. 8, a diagram 800 of one implementation of a scene being captured from two different camera locations 815 and 835 is shown. The scene being captured in the diagram of FIG. 8 includes objects 805 and 810. The camera from location 815 captures a first image of objects 805 and 810, with the distance 820 from location 815 to object 805 and a distance 825 from location 815 to object 810. The first image is represented by snapshot 850, with objects 855 and 860 within snapshot 815 corresponding to objects 805 and 810. Then, at a later point in time, the camera is in location 835. Sensors in the camera capture readings which allow a control circuit to calculate the distance 830 between locations 815 and 835. For the example shown in FIG. 8, it is assumed that the distance 830 is 2 meters (m). It should be understood that this distance is used for illustrative purposes.

Snapshot 865 represents the image captured from location 835, with object 870 shown in snapshot 865 representing object 810. Object 805 is partially hidden in snapshot 865 due to object 810 obscuring the view. From location 835, the distance 845 separates the camera from object 810, and the distance 840 separates the camera from object 805. It is noted that this discussion of FIG. 8 will continue into the below discussion of FIG. 9.

Figure 9:
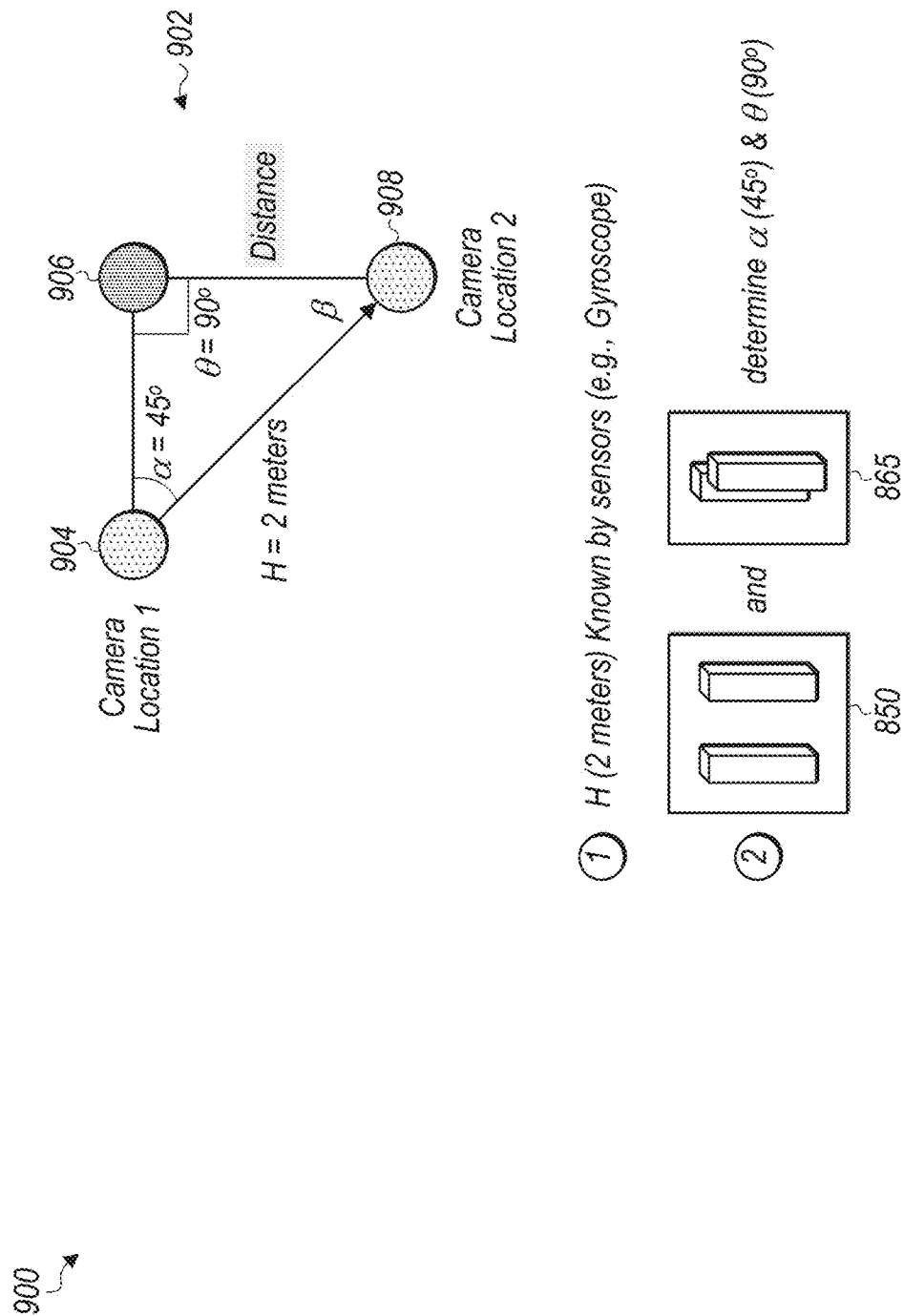
FIG. 9 is a diagram of one implementation for estimating the distance between a camera location and a scene.

Referring now to FIG. 9, a diagram 900 for estimating the distance between a camera location and a given object in a scene in accordance with one implementation is shown. The triangle 902 shown at the top of FIG. 9 represents the previous diagram 800 of FIG. 8 and the two camera locations 815 and 835. In the triangle 902 of FIG. 9, location 904 represents camera location 815 (of FIG. 8), and location 908 represents camera location 835. Object 906 represents object 810 in FIG. 8. It is assumed that the distance "H" has already been calculated as 2 meters based on one or more sensor readings. Accordingly, for triangle 902, the side connecting points 904 and 908 is 2 meters in length.

Next, for the angles $\alpha$ and $\theta$, these are calculated from snapshots 850 and 865 captured from the camera locations 815 and 835 (of FIG. 8). Accordingly, angle $\alpha$ is calculated as 45 degrees and angle $\theta$, is calculated as 90 degrees. This allows the distance between camera location 908 and object 906 to be calculated according to the equation shown in FIG. 9. This equation is the following: Distance=H*sin ($\beta$)/sin ($\theta$)=2*sin(45)/sin(90)=2*0.707/1=1.414 meters. Accordingly, the distance between camera location 908 and object 906 is estimated to be equal to 1.414 meters. This estimate is then provided to the auto-focus mechanism to allow the mechanism to converge faster than would otherwise be possible.

Figure 10:
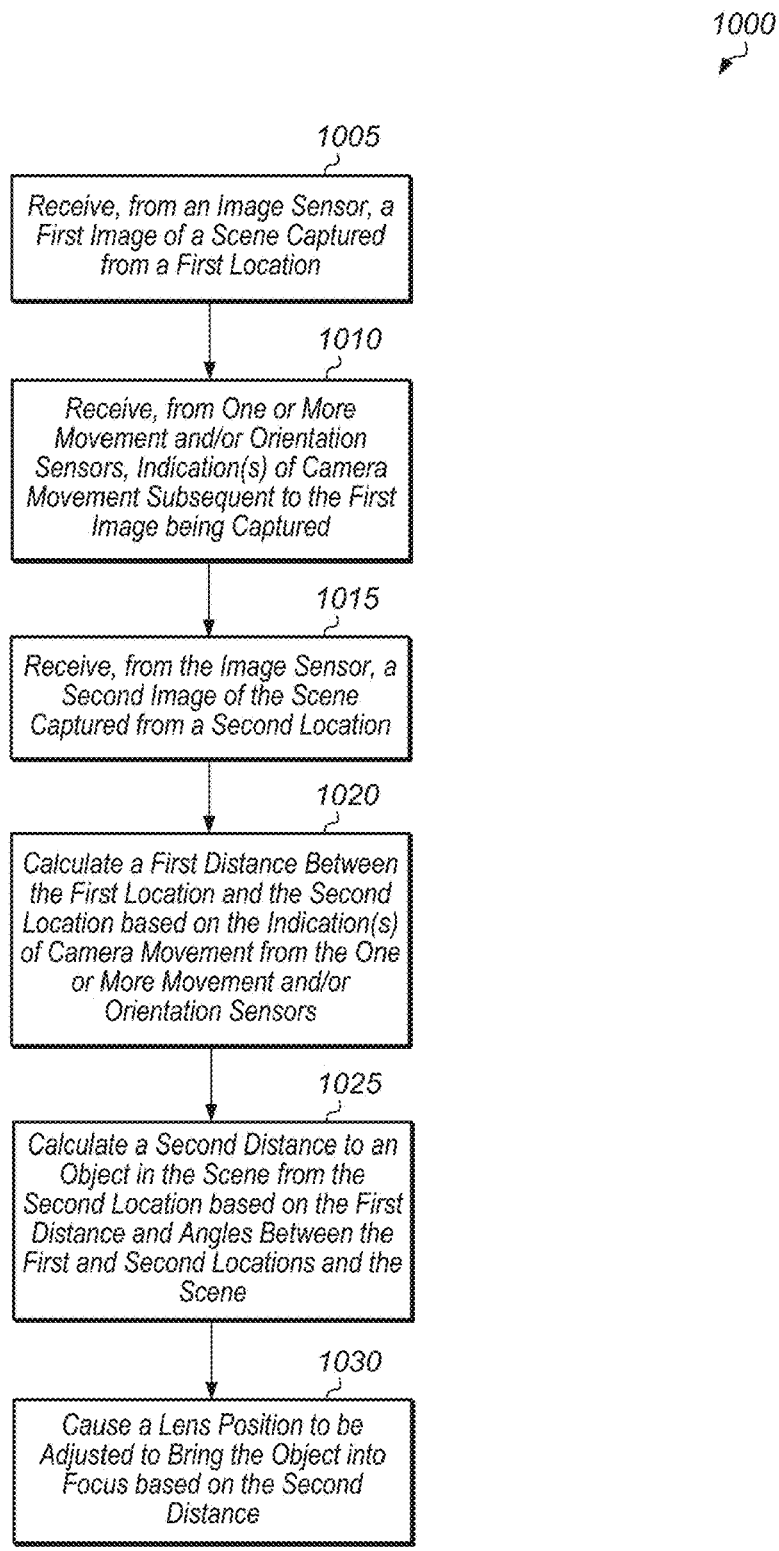
FIG. 10 is a generalized flow diagram illustrating one implementation of a method for achieving rapid auto-focus with distance estimation.
Figure 11:
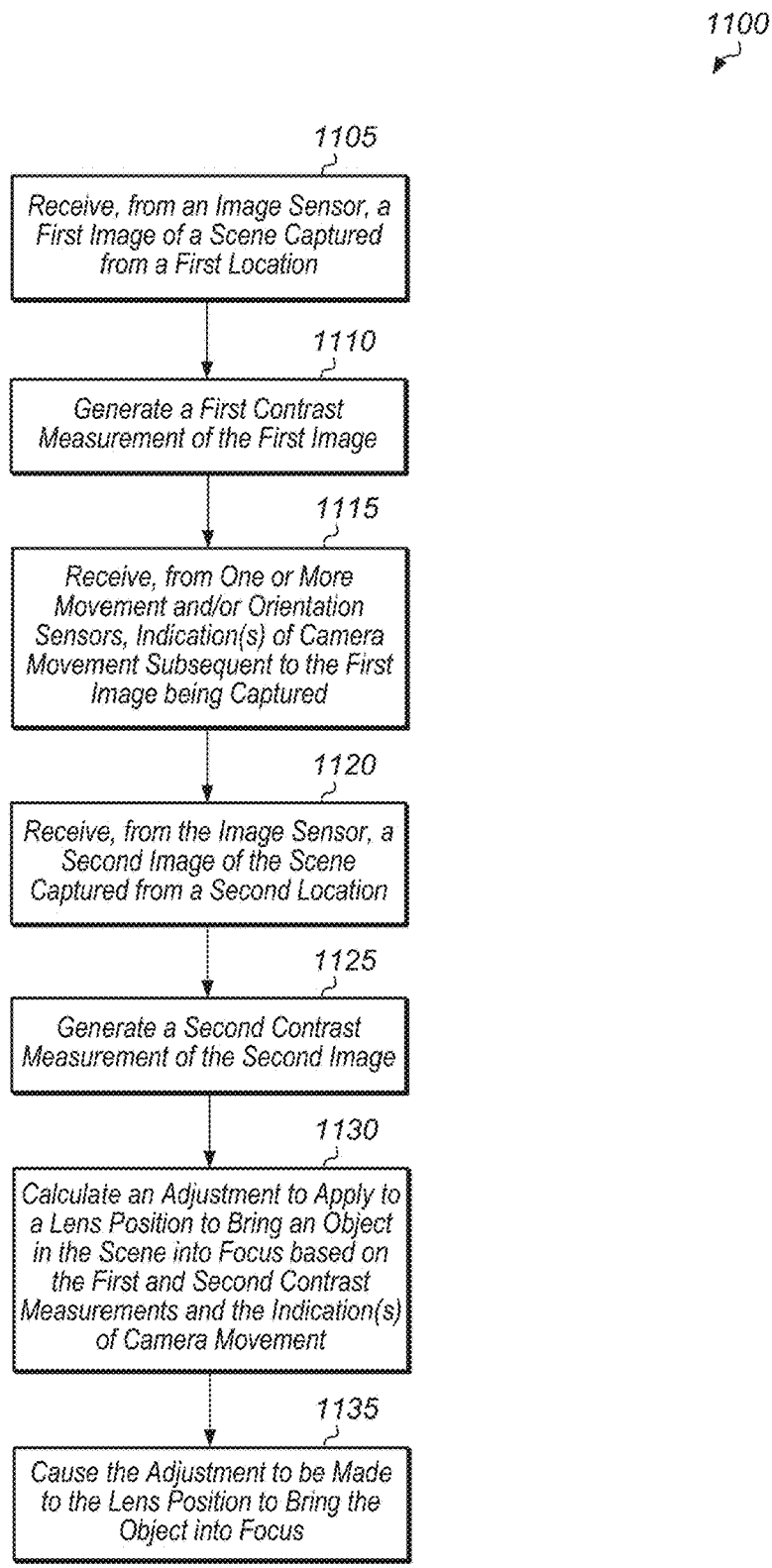
FIG. 11 is a generalized flow diagram illustrating one implementation of a method for achieving rapid auto-focus with contrast measurements and distance estimation.

Turning now to FIG. 10, one implementation of a method 1000 for achieving rapid auto-focus with distance estimation is shown. For purposes of discussion, the steps in this implementation and those of FIG. 11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1000.

A control circuit receives, from an image sensor, a first image of a scene captured from a first location (block 1005).

It is noted that the first image can be captured with or without the user actually pressing a shutter button. Next, the control circuit receives, from one or more movement and/or orientation sensors, indication(s) of camera movement subsequent to the first image being captured (block 1010). Then, at a later point in time, the control circuit receives, from the image sensor, a second image of the scene captured from a second location (block 1015). It is noted that the second image can be captured with or without the user actually pressing a shutter button. Also, the control circuit calculates a first distance between the first location and the second location based on the indication(s) of camera movement from the one or more movement and/or orientation sensors (block 1020).

Next, a distance estimation unit (e.g., distance estimation unit 726 of FIG. 7) of the control circuit calculates a second distance to an object in the scene, detected by an object detection unit (e.g., object detection unit 724 of FIG. 7), from the second location based on the first distance and angles between the first and second locations and the scene (block 1025). Then, the control circuit causes a lens position to be adjusted to bring the object into focus based on the second distance (block 1030). After block 1030, method 1000 ends. It is noted that method 800 can be repeated for subsequent images being captured as the camera continues to move. It is also noted that the lens can be adjusted with or without the user actually pressing a shutter button to capture an image.

Referring now to FIG. 11, one implementation of a method 1100 for achieving rapid auto-focus with contrast measurements and distance estimation is shown. A control circuit receives, from an image sensor, a first image of a scene captured from a first location (block 1105). Next, the control circuit generates a first contrast measurement of the first image (block 1110). Then, at a later point in time, the control circuit receives, from one or more movement and/or orientation sensors, indication(s) of camera movement subsequent to the first image being captured (block 1115). Then, at a still later point in time, the control circuit receives, from the image sensor, a second image of the scene captured from a second location (block 1120). It is noted that the first and second images can be captured with or without the user pressing a shutter button.

Next, the control circuit generates a second contrast measurement of the second image (block 1125). Then, the control circuit calculates an adjustment to apply to a lens position to bring an object in the scene into focus based on the first and second contrast measurements and the indication(s) of camera movement (block 1130). Next, the control circuit causes the adjustment to be made to the lens position to bring the object in the scene into focus (block 1135). After block 1135, method 1100 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A control circuit comprising:
object detection circuitry; and
distance estimation circuitry;
wherein the control circuit is configured to:
receive a first image of a scene captured from a first location of a camera;
receive, via one or more sensors, one or more indications of movement of the camera subsequent to the first image being captured;
receive a second image of the scene captured from a second location of the camera, wherein the second location is a different location than the first location;
calculate a first distance between the first location of the camera and the second location of the camera based on the one or more indications of the movement;
calculate a second distance to an object in the scene from the second location of the camera based on the first distance and based on angles between the first location of the camera and the object and the second location of the camera and the object; and
cause a lens position to be adjusted to bring the object into focus based on the second distance.

2. The control circuit as recited in claim 1, wherein the lens position is adjusted without a user pressing a shutter button to capture an image.

3. The control circuit as recited in claim 1, wherein the second distance is an estimate of a separation between the object and the second location.

4. The control circuit as recited in claim 3, wherein the control circuit is configured to calculate an adjustment to the lens position based on the estimate and based on contrast measurements for the first and second images.

5. The control circuit as recited in claim 1, wherein the second image is captured subsequent to the first image.

6. The control circuit as recited in claim 1, wherein the control circuit is further configured to receive timestamps associated with the first and second images.

7. The control circuit as recited in claim 6, wherein the control circuit is further configured to calculate the first distance between the first location and the second location based on the timestamps and the one or more indications of the movement.

8. A system comprising:
an image sensor;
a lens; and
a control circuit configured to:
receive, from the image sensor, a first image of a scene captured from a first location of a camera;
receive one or more indications of movement of the camera subsequent to the first image being captured;

receive, from the image sensor, a second image of the scene captured from a second location of the camera, wherein the second location is a different location than the first location;

calculate a first distance between the first location of the camera and the second location of the camera based on the one or more indications of the movement;

calculate a second distance to an object in the scene from the second location of the camera based on the first distance and based on angles between the first location of the camera and the object and the second location of the camera and the object; and cause a position of the lens to be adjusted to bring the object into focus based on the second distance.

9. The system as recited in claim 8, wherein the lens is adjusted without a user pressing a shutter button to capture an image.

10. The system as recited in claim 8, wherein the second distance is an estimate of a separation between the object and the image sensor.

11. The system as recited in claim 10, wherein the control circuit is configured to calculate an adjustment to the lens based on the estimate and based on contrast measurements for the first and second images.

12. The system as recited in claim 8, wherein the second image is captured subsequent to the first image.

13. The system as recited in claim 8, wherein the control circuit is further configured to receive timestamps associated with the first and second images.

14. The system as recited in claim 13, wherein the control circuit is further configured to calculate the first distance between the first location and the second location based on the timestamps and the one or more indications of the movement.

15. A method comprising:
receiving, by a control circuit, a first image of a scene captured from a first location of a camera;

receiving one or more indications of movement of the camera subsequent to the first image being captured;

receiving a second image of the scene captured from a second location of the camera, wherein the second location is a different location than the first location;

calculating a first distance between the first location of the camera and the second location of the camera based on the one or more indications of the movement;

calculating a second distance to the scene from the second location of the camera based on the first distance and based on angles between the first location of the camera and the scene and the second location of the camera and the scene; and causing a position of a lens to be adjusted to bring the scene into focus based on the second distance.

16. The method as recited in claim 15, wherein the lens is adjusted without a user pressing a shutter button to capture an image.

17. The method as recited in claim 15, wherein the second distance is an estimate of a separation between the scene and an image sensor.

18. The method as recited in claim 17, further comprising calculating an adjustment to the lens based on the estimate and based on contrast measurements for the first and second images.

19. The method as recited in claim 15, wherein the second image is captured subsequent to the first image.

20. The method as recited in claim 15, further comprising calculating the first distance between the first location and the second location based on received timestamps and the one or more indications of the movement.

* * * * *